(12) United States Patent
Swanger

(10) Patent No.: US 7,474,201 B2
(45) Date of Patent: Jan. 6, 2009

(54) SAFETY UNIT FOR USE ON VEHICLES

(75) Inventor: Eric D. Swanger, Huntersville, NC (US)

(73) Assignee: Specialty Manufacturing, Inc., Los Angeles, CA (US)

( * ) Notice: Subject to any disclaimer, the term of this patent is extended or adjusted under 35 U.S.C. 154(b) by 259 days.

(21) Appl. No.: 11/414,458

(22) Filed: Apr. 28, 2006

(65) Prior Publication Data

US 2007/0252538 A1   Nov. 1, 2007

(51) Int. Cl.
*B60Q 1/26* (2006.01)
(52) U.S. Cl. .............. 340/433; 340/425.5; 340/426.22; 340/426.23; 116/28 R; 116/46; 40/429; 40/430; 40/530; 40/531; 40/533; 40/591
(58) Field of Classification Search ........... 340/433, 340/425.5, 426.22, 426.23; 116/28 R, 42, 116/46; 16/28 R, 42, 46; 40/429, 430, 460, 40/530, 531, 533, 591
See application file for complete search history.

(56) References Cited

U.S. PATENT DOCUMENTS

| 4,138,668 | A | * | 2/1979 | Latta et al. ................... 340/433 |
| 4,559,518 | A | | 12/1985 | Latta, Jr. ...................... 340/130 |
| 4,697,541 | A | | 10/1987 | Wicker ....................... 116/28 R |
| 4,956,630 | A | | 9/1990 | Wicker ......................... 340/433 |
| 4,983,949 | A | | 1/1991 | Wicker ......................... 340/433 |
| 5,132,662 | A | | 7/1992 | Burch .......................... 340/433 |
| 5,812,052 | A | | 9/1998 | Swanger et al. .............. 340/433 |

* cited by examiner

*Primary Examiner*—Daryl C Pope
(74) *Attorney, Agent, or Firm*—K & L Gates LLP

(57) ABSTRACT

A safety unit for use on vehicles such as school buses. In one embodiment, a housing is provided for the drive motor and related elements for moving a stop sign on the side of the bus between its retracted and extended positions. The housing has a removable cover to provide access to the drive motor and related elements, and the stop sign is mounted on a driveshaft that extends through a single opening in the bottom wall of the housing. In a second embodiment the safety unit is integrated with an access panel on the school bus.

18 Claims, 5 Drawing Sheets

SAFETY UNIT FOR USE ON VEHICLES

BACKGROUND OF THE INVENTION

The present invention relates generally to safety units that are attached to vehicles, and more particularly to safety units that deploy safety devices, such a stop arms and stops signs, and that are attached to the exterior walls of a vehicle, such a school bus.

In vehicles that are designed to transport a large number of passengers, such as school buses, it is common practice and usually required by law that such vehicles be provided with a variety of safety units that are designed to provide protection to the passengers. For example, school buses are almost always provided with safety units that include drive motors for moving safety devices in the form of crossing arms and stop arms between retracted and extended positions relative to the vehicle. In the case of stop arms, the units are usually directly bolted or otherwise secured to an exterior side wall of the vehicle so that the stop arms can be extended when the school bus stops to load or unload passengers, thereby warning approaching motorist to stop and not pass the school bus when it is stopped. In the case of crossing arms, the units are mounted on the front bumper of the school bus and the crossing arm safety device can be moved by the vehicle operator to an extended position to force children walking in front of the bus to walk at a location spaced far enough in front of the bus so as to be easily seen by the vehicle operator.

In known safety units of this type, the drive motor, the electrical components for controlling the drive motor, and the operating mechanisms for the safety device are usually mounted as a unit to either an exterior wall or the front bumper of the vehicle by screws, bolts or the like. Typical safety units of this type are disclosed, for example, in U.S. Pat. Nos. 4,697,541, 4,983,949, 4,559,518, 5,812,052 and 4,956,630. These typical units include a bracket that is bolted directly to the vehicle, and a pivot member that is pivotally mounted to the bracket and that has the safety device mounted thereon. The pivot member has two parallel extending arms that are each pivotally mounted on top and bottom flanges of the bracket, respectively, and it is formed with a support plate located adjacent the two pivot points on which the safety device can be mounted for pivotal movement with the pivot member.

It is well known that school buses and similar vehicles are exposed to all kinds of adverse weather conditions, including rain, sleet, and snow, and because the aforesaid known safety units are mounted on the exterior of the vehicle, they are also exposed to such adverse weather conditions. Since one of the arms of the pivot member is pivotally mounted at the top flange of the support bracket, there is a danger that moisture and other foreign matter may flow downwardly through the top pivot openings in the pivot member and the mounting bracket into the interior of the safety unit where the moisture and other foreign matter can adversely effect the operation of the drive motor, the electrical components associated with the control of the drive motor, and/or the mechanisms that are contained within the safety unit for moving the safety device. Moreover, the mounting and drive arrangement in the known safety units inherently include a relatively large number of parts, and therefore the installation and maintenance of these parts can be time consuming. The location of the support plate portion of the pivot member is such that in its normal closed position (e.g. safety device retracted), it covers in whole or in part the drive motor, the electrical control components, and the mechanisms for moving the safety device. Therefore, when it is necessary to get to these interior components for maintenance or repair, it may be necessary to dismantle the pivot member from the support bracket to perform the maintenance or repair, which is time consuming. Finally, since the pivot member moves away from the mounting bracket when the safety device is deployed to its extended position, the aforesaid interior components are generally uncovered and exposed to adverse weather conditions.

In accordance with the present invention, a safety unit is provided which overcomes some or all of the aforesaid disadvantages of known safety units.

SUMMARY OF THE INVENTION

In one embodiment of the present invention, a safety unit is provided for use on vehicles. The safety unit has a housing that includes a cover and a wall portion having one opening therein, the housing being adapted to be mountable on the vehicle. A drive motor is mounted on the housing, and a shaft member is provided which has a first end portion connected to the drive motor for movement thereby. The shaft member extends outwardly from the housing solely through the one opening in the wall portion of the housing, and has a second end portion located exteriorly of the housing that is adapted to provide the sole support for a safety device that is moved by the shaft member between a retracted position and an extended position.

Preferably, the wall portion of the housing is located at the bottom portion of the housing, and the shaft member may be generally U-shaped with an intermediate portion extending generally horizontally between the first and second end portions of the shaft member. It is also preferred that the cover of the housing be removable.

In another embodiment of the present invention, the safety unit is integrated with an access panel that is mountable on a vehicle for movement to selectively provide access to a compartment of the vehicle. The access panel includes an opening therein, and a housing that includes a cover and a wall portion is mounted on the access panel to extend over one side of the opening in the access panel. A drive motor is mounted on the housing and it is located to be accessible through the opening in the access panel. A shaft member is provided which has a first end portion connected to the drive motor within the housing for movement thereby. The shaft member extends outwardly from the housing, and has a second end portion located exteriorly of the housing that is adapted to support a safety device that is moved by the shaft member between a retracted position and an extended position. The shaft member is also located to be accessible through the opening in the access panel.

In this embodiment, it is preferred that the wall portion be located at the bottom of the housing, and that this wall portion have an opening therein. The one end of the shaft member may extend outwardly from the housing solely through the opening in the wall portion. It is also preferred that the shaft member be generally U-shaped with an intermediate portion extending generally horizontally between the first and second end portions of the shaft member, and the second end portion of the shaft member extends generally upwardly.

DESCRIPTION OF THE PREFERRED EMBODIMENTS OF THE PRESENT INVENTION

Figure 1:
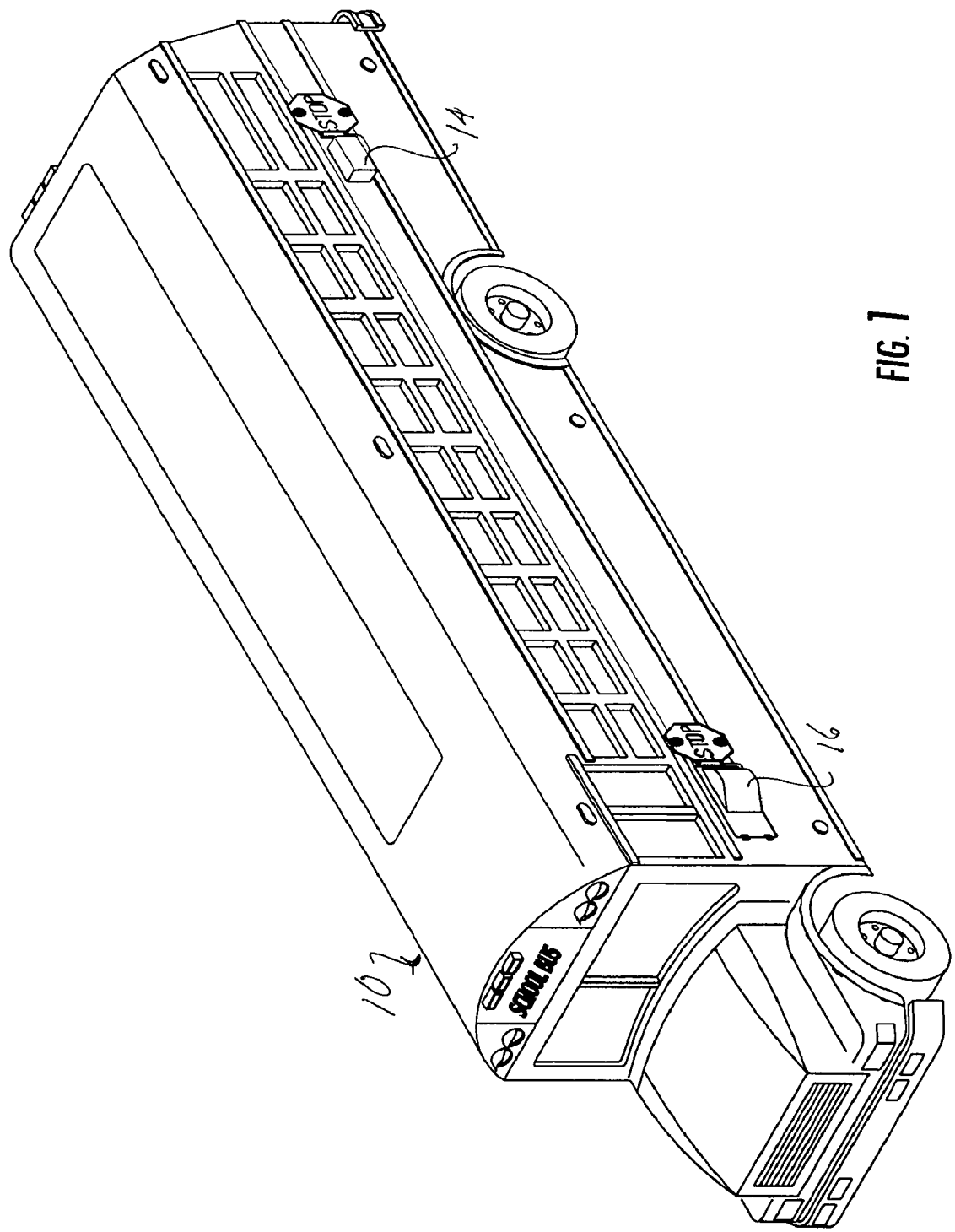
FIG. 1 is a perspective view of a school bus on which are mounted two embodiments of the safety unit of the present invention.

Looking now in greater detail at the accompanying drawings, FIG. 1 is a perspective view that illustrates a typical vehicle of the type on which the safety units of the present invention can be used, namely a school bus 10, and one embodiment of a safety unit 12 is shown attached to the side wall of the school bus 10 near the rear end thereof. A second embodiment of the present invention provides an integrated safety unit and access panel 14 which is shown mounted on a side wall of the vehicle near the front end thereof.

Figure 2:
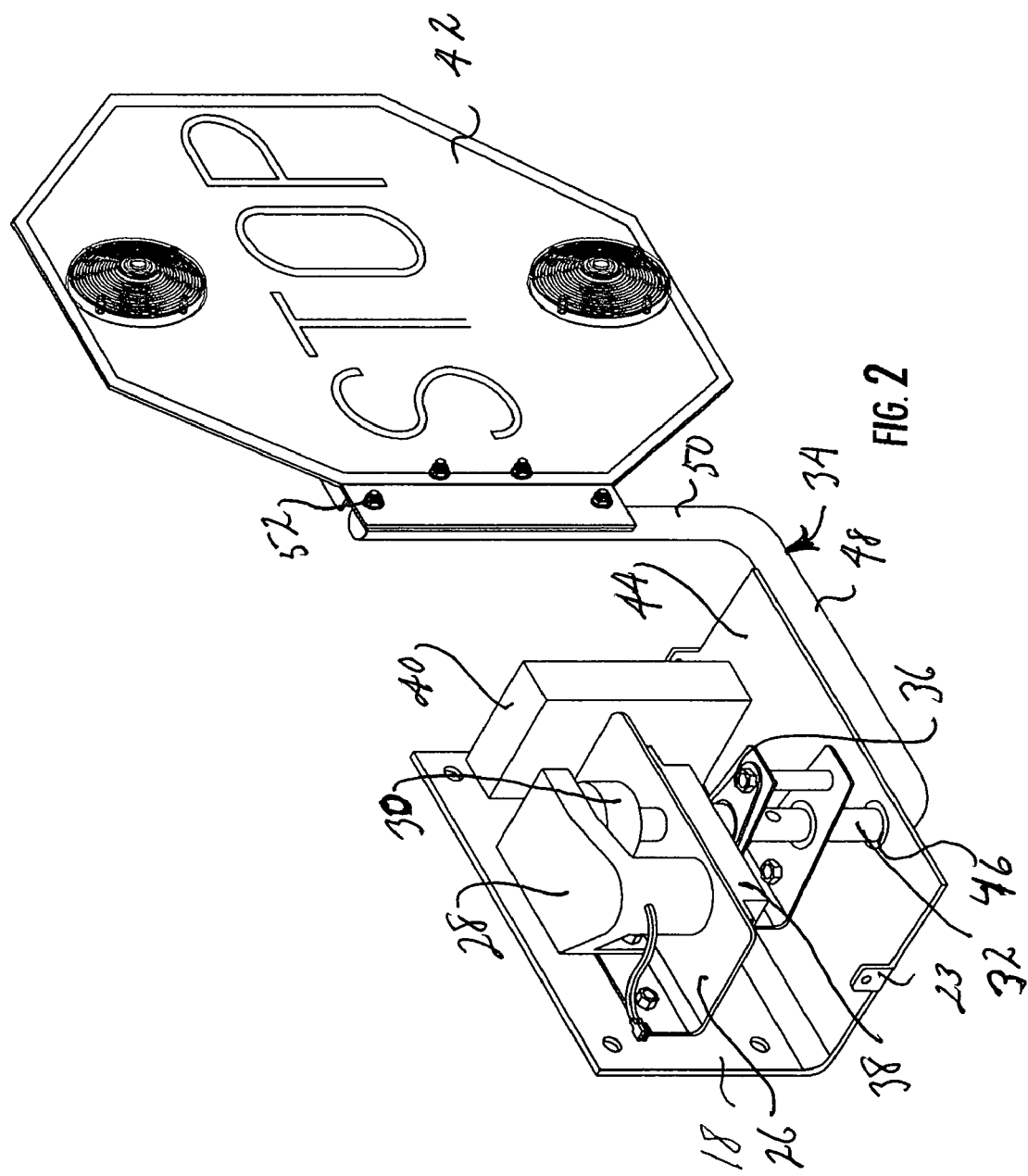
FIG. 2 is a perspective view of a first embodiment of the safety unit of the present invention, with the cover removed for clarity of illustration.
Figure 3:
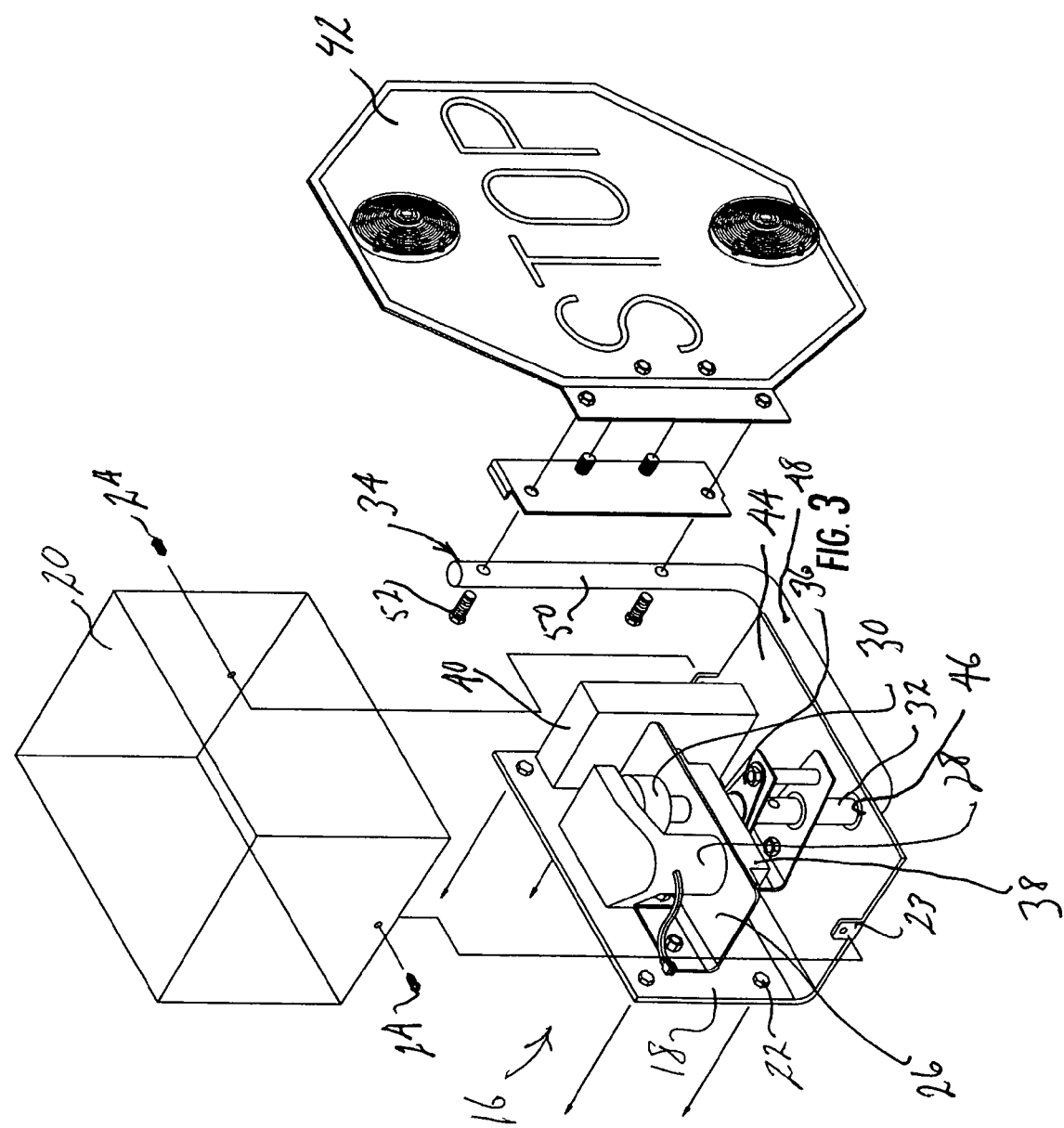
FIG. 3 is an exploded view of the safety unit illustrated in FIG. 1, and also illustrating the removable cover.

The safety unit 12 is best illustrated in FIGS. 2 and 3, and it includes a housing 16 comprised of a mounting bracket 18 and a removable cover 20. The mounting bracket 18 is attached to the side wall of the vehicle 10 as illustrated in FIG. 1 by a plurality of screws, bolts, or other equivalent attachment members 22, and as best seen in FIG. 3, the mounting bracket 18 includes two upstanding ears 23 which receive screws 24 for mounting the removable cover 20 on the mounting bracket 18. The mounting bracket 18 includes a horizontal support flange 26 on which is mounted an electrically operated drive motor 28. The output from the drive motor 28 is connected to a slip clutch 30. The output end of the slip clutch 30 is connected to a first end portion 32 of a generally U-shaped driveshaft 34 which is mounted for pivotal movement in a bearing assembly 36. A conventional electrical control unit 38 is mounted beneath the horizontal flange 26 and electrically connected (not shown) to control the operation of the drive motor 28 in a conventional manner, and, preferably, a conventional electrical flasher unit 40 is mounted on the bracket 18 and connected through wires (not shown) to lights on the stop sign 42 which will be explained in greater detail below.

In accordance with one feature of the present invention, the mounting bracket 18 includes a bottom wall portion 44 which is formed with a single opening 46 therein, and as best seen in FIG. 3, the above-described first end portion 32 of the driveshaft 34 extends downwardly through the single opening 46, and, if desired, that opening 46 may be sealed around the first end portion 32. As is clearly shown in FIGS. 2-4, the cross sectional area of the first end portion 32 is substantially the same as the area of the opening 46 so that when the first end portion 32 extends through the opening 46, the opening 46 is effectively closed so that is very unlikely that any rain, sleet snow or other foreign matter can pass through the opening 46 and into the interior of the mounting bracket 18 and the cover 20. The driveshaft 34 also includes a horizontally extending portion 48 and a second end portion 50 that extends upwardly from the intermediate portion 48. The vertically extending second end portion 50 has the stop sign 42 mounted thereon by bolts 52, and it will be noted that the vertically extending second end portion 50 constitutes the sole support for the stop sign 42.

As is well known in the trade, when the school bus 10 is stopped and children are boarding or leaving the school bus 10, the control unit 38 is operated to energize the drive motor 28 and pivot the driveshaft 34 so that the stop sign 42 is moved outwardly from the side of the school bus 10 to its extended position. After the children have safely boarded or left the school bus 10, the control unit 38 is again operated to pivot the driveshaft 34 back to its retracted position along side the side wall of the school bus 10.

Based on the above, it will be apparent that when the cover 20 is mounted to the mounting bracket 18 by the screws 24, the interior of the housing is completely covered, and the only opening in the housing 16 is the single hole 46 in the bottom wall 44 of the mounting bracket 18. If desired, conventional sealing material not shown) may be located around the mounting bracket 18 and the removable cover 20 to further protect the interior of the housing 16 when the cover 20 is in place on the mounting bracket 18. Since the removable cover 20 has no openings in the walls thereof, it combines with the bottom wall 44 of the mounting bracket 18 to completely cover the interior elements within the housing 16, except for the single opening 46 through which the driveshaft first end portion 32 extends. Thus, there is only one small opening in the housing 16 when the removable cover is in place, and this opening is at the bottom wall where it would be difficult for rain, sleet or snow to penetrate the opening 46 and get into the interior of the housing 16.

Additionally, as best seen in FIG. 2, when the cover 20 is removed, each of the elements that are normally within the housing 16 are now readily accessible for maintenance, replacement, or repair, and none of these elements have to be removed to provide access to other elements.

Figure 4:
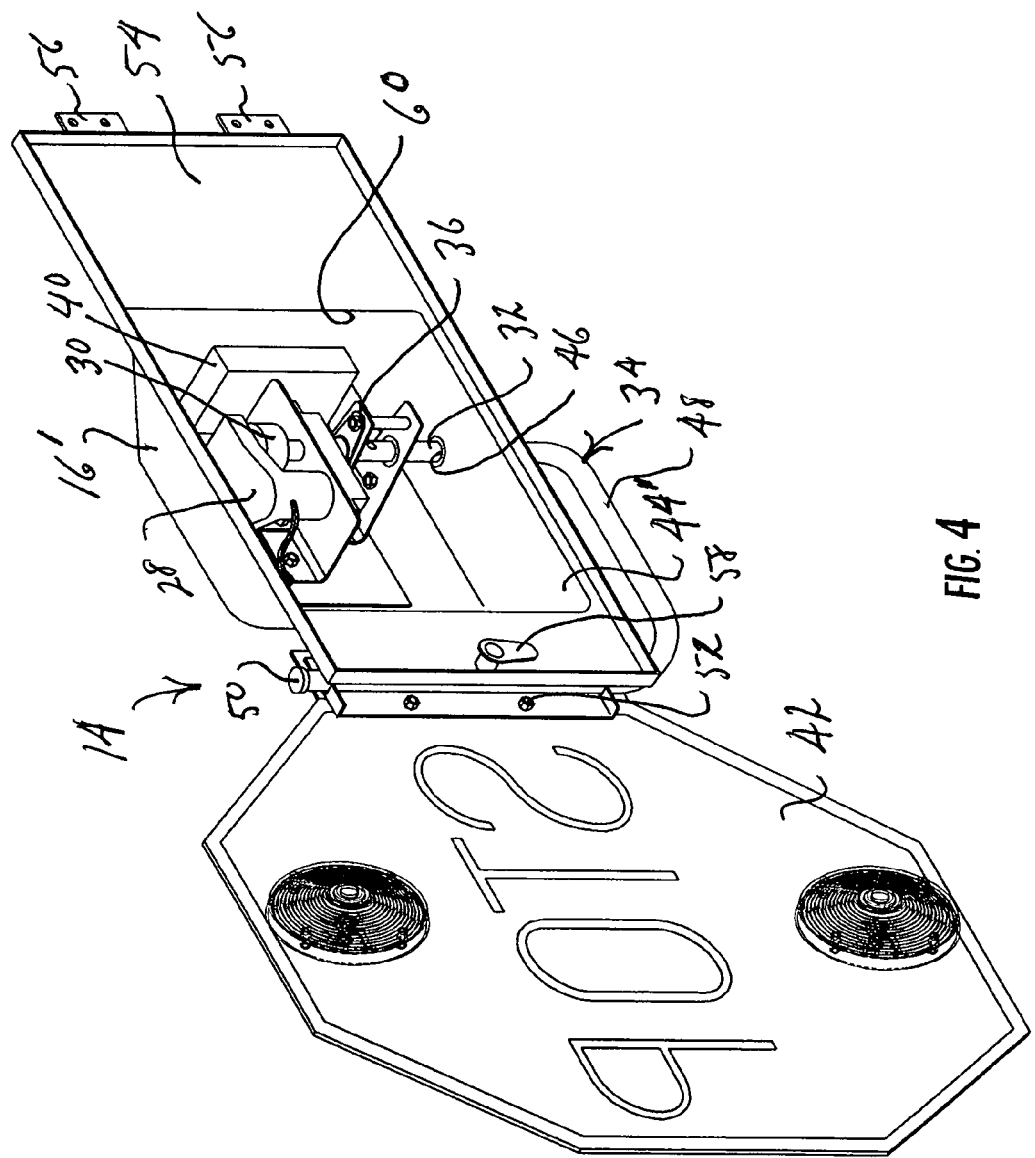
FIG. 4 is a perspective view of a second embodiment of the safety unit of the present invention integrated with an access panel and taken from one side of the access panel.
Figure 5:
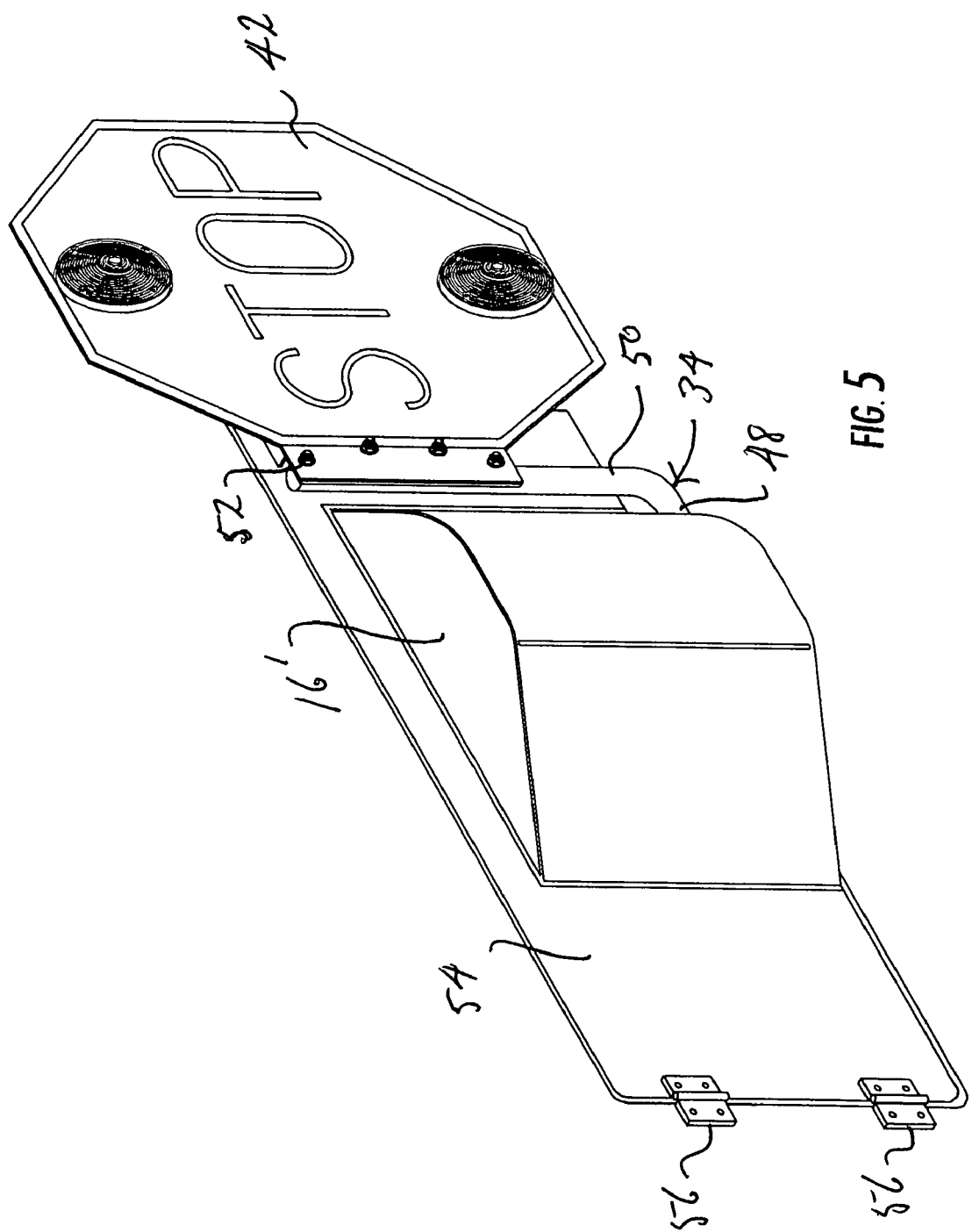
FIG. 5 is a perspective view of the safety unit illustrated in FIG. 4 taken from the other side of the access panel.

Safety unit 14, which is a second embodiment of the present invention, is best illustrated in FIGS. 4 and 5, and to the extent that the elements illustrated in FIGS. 4 and 5 are identical to those described above in connection with the first embodiment of the present invention, the same reference numerals are used to identify such elements.

In most vehicles, such as the school bus 10, open compartments (not shown) are built in to the side walls of the school bus 10 to house a variety of components associated with the operation of the school bus 10 itself, such as, for example, a compartment that has fuses and/or other electrical components. Safety unit 16 integrates a conventional access panel that covers such a compartment with the stop sign operating unit that is used to move the stop sign 42 between its retracted and extended positions at the side of the school bus 10.

More specifically, and as best seen in FIGS. 4 and 5, the access panel 54 is generally flat, and it includes hinges 56 for pivotally mounting the access panel 54 over the compartment in the side wall of the school bus 10 so that it can be pivoted outwardly to provide access to the interior of the compartment, and then pivoted inwardly to cover the compartment. A conventional latching element 58 is generally provided to permit the access panel 54 to be securely held in place to cover the compartment. However, in accordance with the present invention the conventional access panel 54 is modified by cutting or otherwise forming an opening 60 (see FIG. 4) in the access panel 54. In the safety unit 14 the housing 16' is in the form of an enclosure that is formed inwardly with the outside surface of the access panel 54. The housing 16' may be welded to the access panel 54, it may be molded from plastic as one piece with the access panel, it may be a stamped metal integration, such as steel or aluminum or other appropriate metal, or any other equivalent manner for forming a seamless juncture between the access panel 54 and the housing 16'.

As best seen in FIG. 4, which is a view that is looking at the inside wall of the access panel 54, it will be seen that all of the previously described elements for moving the stop sign 42 between its extended and retracted positions are directly mounted within the housing 16'. It will also be noted that, like the embodiment illustrated in FIGS. 4 and 3 and described above, the housing 16' is formed with only one opening or hole 46 in the bottom wall portion 44' of the housing 16'. It will also be noted that when the access panel 54 is pivoted outwardly away from the side of the school bus 10 on the hinges 56, the interior of the housing 16', and all of the elements mounted therein, are readily accessible through the opening 60, whereby maintenance, repairs, and replacement of these elements can be easily carried out without any obstruction to the access to the elements.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A safety unit for use on vehicles which includes:
   (a) a housing that includes a cover and a wall portion having one opening therein, the housing being adapted to be mountable on the vehicle;
   (b) a drive motor mounted on the housing; and
   (c) a shaft member having a first end portion connected to the drive motor for movement thereby, the shaft member extending outwardly from the housing solely through the one opening in the wall portion of the housing and having a second end portion located exteriorly of the housing that is adapted to provide the sole support for a safety device that is moved by the shaft member between a retracted position and an extended position.

2. A safety unit as defined in claim 1, wherein the wall portion is located at the bottom portion of the housing.

3. A safety unit as defined in claim 2, wherein the shaft member is generally U-shaped with an intermediate portion between the first and second end portions extending generally horizontally, and with the second end portion thereof extending generally upwardly.

4. A safety unit as defined in claim 1, wherein the cover is removable.

5. A safety unit as defined in claim 1, wherein the housing is fixed to an access panel of a vehicle.

6. A safety unit as defined in claim 5, wherein the access panel includes a hinge that is adapted to be attachable to a side wall of the vehicle.

7. A safety unit as defined in claim 5, wherein the access panel has an opening therein that is located to provide open access to the interior of the housing through the opening.

8. A safety unit as defined in claim 1, wherein the housing is adapted to be attached to an exterior side wall of the vehicle.

9. A safety unit for use on vehicles which includes:
   (a) a housing that includes a removable cover, the housing including a wall portion located at the bottom thereof with one hole formed in the bottom wall portion, the housing being adapted to be mountable on the vehicle;
   (b) a drive motor mounted on the housing; and
   (c) a generally U-shaped shaft member having a first end portion connected to the drive motor within the housing for movement thereby and extending generally downwardly and outwardly from the housing solely through the one opening in the wall portion of the housing, the shaft member having a second end portion located exteriorly of the housing that extends generally upwardly and being adapted to provide the sole support for a safety device that is moved by the shaft member between a retracted position and an extended position; and the shaft member having an intermediate portion extending generally horizontally between the first and second end portions.

10. A integrated safety unit for use on vehicles which includes:
    (a) an access panel that is mountable on a vehicle for movement to selectively provide access to a compartment of the vehicle, the access panel including an opening therein;
    (b) a housing that includes a cover with a wall portion, the housing being integral with the access panel to extend over one side of the opening in the access panel;
    (c) a drive motor mounted on the housing and located to be accessible through the opening in the access panel; and
    (d) a shaft member having a first end portion connected to the drive motor within the housing for movement thereby, the shaft member extending outwardly from the housing, the shaft member having a second end portion located exteriorly of the housing that is adapted to support a safety device that is moved by the shaft member between a retracted position and an extended position, the shaft member being located to be accessible through the opening in the access panel.

11. A safety unit as defined in claim 10, wherein the wall portion is located at the bottom portion of the housing.

12. A safety unit as defined in claim 11, wherein the wall portion has one opening therein, and wherein the shaft member extends outwardly from the housing solely through the one opening in the wall portion of the housing.

13. A safety unit as defined in claim 11, wherein the shaft member is generally U-shaped with an intermediate portion extending generally horizontally between the first and second end portions, and with the second end portion thereof extending generally upwardly.

14. An integrated safety unit for use on vehicles which includes:
    (a) an access panel that is adapted to be mountable on a vehicle for movement to selectively provide access to a compartment of the vehicle, the access panel including an opening therein;
    (b) a housing that includes a cover and a wall portion, the housing being formed integrally as one piece with the access panel with the housing extending over one side of the opening in the access panel;
    (c) a drive motor mounted within the housing and being located to be accessible through the opening in the access panel; and
    (d) a shaft member having a first end portion connected to the drive motor within the housing for movement thereby, the shaft member extending outwardly from the housing, the shaft member having a second end portion located exteriorly of the housing that is adapted to support a safety device that is moved by the shaft member between a retracted position and an extended position, the shaft member being located to be accessible through the opening in the access panel.

15. A safety unit as defined in claim 14, wherein the housing is welded to the access door.

16. A safety unit as defined in claim 14, wherein the housing and the access panel are molded from plastic as one piece.

17. A safety unit as defined in claim 14, wherein the housing and the access panel are formed integrally from a piece of stamped metal.

18. A safety unit for use on vehicles which includes (a) an enclosed housing that includes a cover and a wall portion having only one opening therein, the housing being adapted to be mountable on the vehicle;

(b) a drive motor mounted within the enclosed housing; and (c) a shaft member having a first end portion connected to the drive motor for movement thereby, the shaft member extending outwardly from the housing solely through the one opening in the wall portion of the housing and having a second end portion located exteriorly of the housing that is adapted to provide the sole support for a safety device that is moved by the shaft member between a retracted position and an extended position, the cross-sectional area of the first end portion being substantially the same as the area of the one opening, whereby the first end portion effectively closes the one opening.

* * * * *